United States Patent
Zheng et al.

(10) Patent No.: US 11,144,291 B1
(45) Date of Patent: Oct. 12, 2021

(54) LOOP-ORIENTED NEURAL NETWORK COMPILATION

(71) Applicant: Amazon Technologies, Inc., Seattle, WA (US)

(72) Inventors: Hongbin Zheng, San Jose, CA (US); Preston Pengra Briggs, Seattle, WA (US); Tobias Joseph Kastulus Edler von Koch, Austin, TX (US); Taemin Kim, Portland, OR (US); Randy Renfu Huang, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/698,320

(22) Filed: Nov. 27, 2019

(51) Int. Cl.
- *G06F 9/44* (2018.01)
- *G06F 8/41* (2018.01)
- *G06N 3/04* (2006.01)

(52) U.S. Cl.
CPC ............ *G06F 8/4443* (2013.01); *G06F 8/433* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 2007/0169059 A1* | 7/2007 | Halambi ............... | G06F 8/4452 717/160 |
| 2016/0055120 A1* | 2/2016 | Vorbach ............... | G06F 15/7814 712/17 |
| 2016/0085530 A1* | 3/2016 | Duran Gonzalez ..... | G06F 8/452 717/105 |
| 2016/0110171 A1* | 4/2016 | Bikshandi ............... | G06F 8/443 717/160 |
| 2018/0307470 A1* | 10/2018 | Lethin ...................... | G06F 8/443 |
| 2018/0373509 A1* | 12/2018 | Zhang ...................... | G06F 8/447 |
| 2019/0042224 A1* | 2/2019 | Caballero de Gea ........................ G06F 8/4441 |
| 2019/0303156 A1* | 10/2019 | Panda ..................... | G06N 3/063 |

* cited by examiner

*Primary Examiner* — Insun Kang
(74) *Attorney, Agent, or Firm* — Kilpatrick Townsend & Stockton LLP

(57) ABSTRACT

Methods of accelerating the execution of neural networks are disclosed. A description of a neural network may be received. A plurality of operators may be identified based on the description of the neural network. A plurality of symbolic models associated with the plurality of operators may be generated. For each symbolic model, a nested loop associated with an operator may be identified, a loop order may be defined, and a set of data dependencies may be defined. A set of inter-operator dependencies may be extracted based on the description of the neural network. The plurality of symbolic models and the set of inter-operator dependencies may be analyzed to identify a combinable pair of nested loops. The combinable pair of nested loops may be combined to form a combined nested loop.

20 Claims, 11 Drawing Sheets

```
                                    for (W = 1:16) {
                                      for (X = 1:55) {
                                        for (Y = 1:55) {
                                          for (Z = 1:64) {
  ┌──────────────┐                         define Data 2 based on Data 1
  │ Operator 202-3│   Nested                define Data 4 based on Data 3
  │  Tensor 210   │   Loop                  define Data 5 based on Data 2 and Data 4
  │ [16, 55, 55, 64]│  302-1                 define Data 6 based on Data 5
  └──────────────┘                          store Data 6
                                          }
                                        }
                                      }
                                    } for (W = 1:16) {
                                      for (X = 1:55) {
                                        for (Y = 1:55) {
                                          for (Z = 1:64) {
  ┌──────────────┐                         read Data 6
  │ Operator 202-4│   Nested                define Data 7 based on Data 6
  │  Tensor 212   │   Loop                  define Data 8 based on Data 7
  │ [16, 55, 55, 64]│  302-2                 define Data 9 based on Data 8
  └──────────────┘                         }
                                        }
                                      }
                                    }
```

FIG. 3

```
                                    for (W = 1:16) {
                                      for (X = 1:55) {
                                        for (Y = 1:55) {
                                          for (Z = 1:64) {
  ┌──────────────┐                         define Data 2 based on Data 1
  │  Combined    │                          define Data 4 based on Data 3
  │ Operator 402 │   Fused                  define Data 5 based on Data 2 and Data 4
  │  Tensor 210  │ Nested Loop               define Data 8 based on Data 5
  │ [16, 55, 55, 64]│    404                   define Data 9 based on Data 8
  └──────────────┘                         }
                                        }
                                      }
                                    }
```

FIG. 4

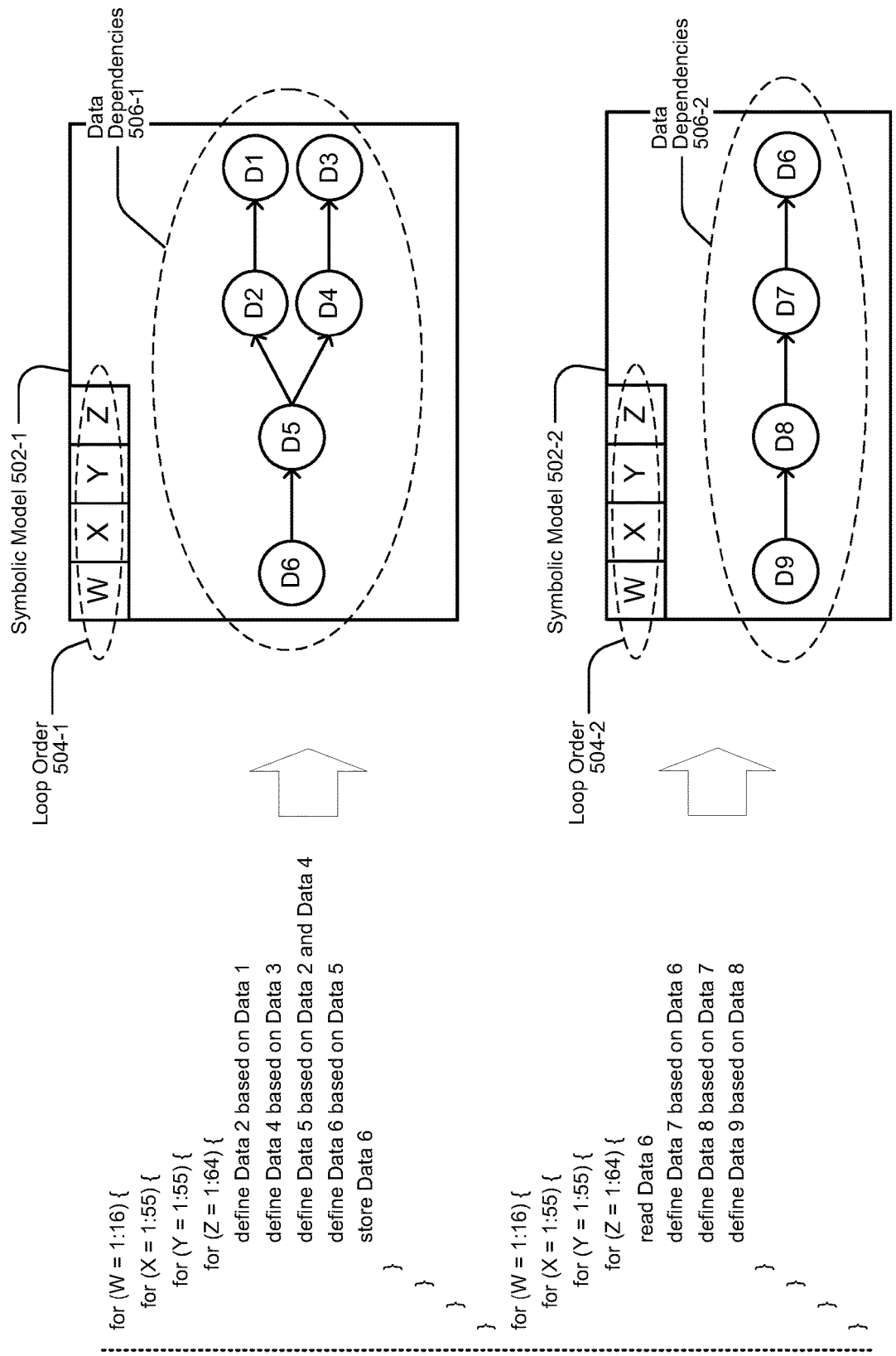

LOOP-ORIENTED NEURAL NETWORK COMPILATION

BACKGROUND

Artificial neural networks are computing systems with an architecture based on biological neural networks. Artificial neural networks can be trained using training data to learn how to perform a certain task, such as identifying or classifying physical objects, activities, characters, etc., from images or videos. An artificial neural network, such as a deep neural network, may include multiple layers of processing nodes. Each processing node in a layer can perform computations on input data generated by processing nodes in the preceding layer to generate output data. For example, a processing node may perform a set of arithmetic operations such as multiplications and additions to generate an intermediate output, or perform post-processing operations on the intermediate output to generate a final output. An artificial neural network may include thousands or more of processing nodes and millions or more of parameters.

The architecture of a neural network may include an input layer, an output layer, and a number of intermediate layers, often referred to as hidden layers. Each layer executes a computation on the outputs of the previous layer, with the last layer (the output layer) providing a final result. With more layers, a neural network can, theoretically, perform more complex tasks, such as language translations and identifying (or classifying) the contents of an image. A neural network with more than three hidden layers is sometimes referred to as a deep neural network. Deep neural networks can have many hidden layers, such as, for example, between five and more than a thousand layers.

Neural networks can be implemented using a central processing unit (CPU) to perform the computations. CPUs, however, tend to be optimized for sequential rather than parallel computations, and thus can suffer from poor response times. Graphics processing units (GPUs) are optimized for parallel computations, but not necessarily for the result from one computation unit to be provided directly to another computation unit. Often, the result must first be written to a memory and then read back. Although GPUs can have better response times than CPUs, it would still be desirable to improve the execution time of a neural network. Recently, special-purpose integrated circuit devices, such as neural network processors or accelerators, have been developed to execute neural networks more efficiently than either CPUs or GPUs.

BRIEF DESCRIPTION OF THE DRAWINGS

Various embodiments in accordance with the present disclosure will be described with reference to the drawings.

FIG. 3 illustrates an example of a textual representation of a graph for two neural network operators;

FIG. 4 illustrates an example of a textual representation for a combined neural network operator;

FIG. 5 illustrates an example of various steps that may be performed to generate symbolic models associated with two neural network operators;

DETAILED DESCRIPTION

Figure 1:
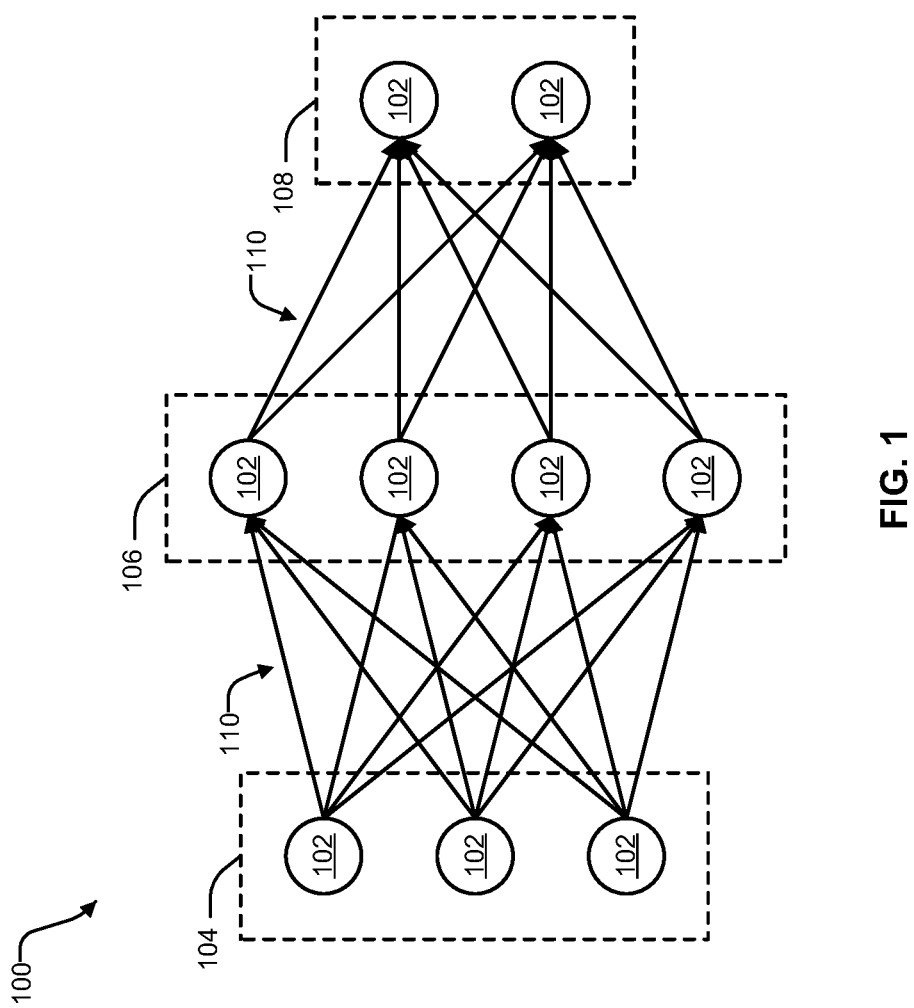
FIG. 1 illustrates an example of a computational flow model for a neural network.

Neural networks can include many interconnected operators of several different operator types. Operators of the same type may perform similar operations on the input data. For example, one type of operator may be an addition operator that adds two tensors together. Another type of operator may be a convolution operator that convolves an input tensor with a filter, which is characterized by a set of weights. While two convolution operators may perform operations that are structurally similar on their respective input tensors, the operations differ by the particular weights of each convolution operation. In many cases, neural networks may include only a few different types of operations. As such, repeated structures can be found throughout many neural networks.

One repeated structure that is found in neural networks is a nested loop, which may be manifested at certain intermediate representations generated by the compiler. In a simple example, a nested loop includes a single outer loop and a single inner loop within the body of the outer loop. The outer loop and the inner loop may each iterate across a different range of values. The first pass of the outer loop triggers the inner loop, which executes across its entire range of values. Upon completion of the inner loop, the outer loop moves to a second value within its range of values and again triggers the inner loop, which again executes across its entire range of values. In a more general case, a nested loop may include multiple loops, including an inner loop, an outer loop, and one or more intermediate loops. In some cases, a nested loop may include a single loop.

Both the compile time and the runtime associated with a neural network is affected by the number of nested loops found in the neural network as well as the number of loops in each of the nested loops. For certain applications of neural networks, such as speech recognition or image analysis, it may be important to achieve runtimes that are sufficiently fast. Reducing the number of loops in each of the nested loops can be challenging since the number of loops associated with an operator is often a function of the size of the input. In some cases, for example, the input tensor used is four dimensional and therefore the number of loops needed to iterate across all values of the input tensor is four.

Reducing the total number of loops can be challenging due to the complexity of determining whether different loop nests are combinable. For example, different loop nests may not be combinable if they include different numbers of loops, different ranges of values in one or more loops, different functions that are performed within the innermost loops, different data dependencies associated with the data that is defined in the nested loops, and the like.

Embodiments described herein provide methods, systems, and other techniques for reducing the number of iterations and/or reducing the data movement associated with compilation and execution of a neural network by combining nested loops. Embodiments may be implemented by a compiler that receives a description of a neural network and generates machine instructions for the neural network to be executed on a processor.

During compilation, and prior to generating the machine instructions, the compiler may analyze the description of the neural network and identify a plurality of operators. The compiler may also identify an operator type for each of the operators. Based on the operator type, the compiler may determine whether each of the operators includes a nested loop and the number of loops therein. The compiler may gather other data regarding each nested loop, such as the data that are defined or modified (referred to herein as the "defined data" or the "defined data elements") within the nested loop and the data that are used in the calculation of the defined data (referred to herein as the "dependent data" or the "dependent data elements").

In some embodiments, the compiler may determine a loop order for each of the nested loops. The loop order may include multiple ranges of values that are iterated through. For example, one particular loop order may include a first index that is iterated over a first range of values, a second index that is iterated over a second range of values, and a third index that is iterated over a third range of values. In one example, the first, second, and third ranges of values may include all integers between 1 and 16, 1 and 55, and 1 and 64, respectively, and the first, second, and third indices may be X, Y, and Z, respectively. The loop order may include the order associated with the first, second, and third indices, such that the loop order may indicate that X corresponds to the outer loop, Y corresponds to the intermediate loop, and Z corresponds to the inner loop.

In some embodiments, the compiler may determine a set of data dependencies for each of the nested loops. The set of data dependencies may include each data element that is generated or defined in each nested loop, i.e., the defined data elements, and each data element used in the calculation of the defined data elements, i.e., the dependent data elements. In one example, a set of data dependencies may include a first data element that is defined based on a second data element, and a third data element that is defined based on a fourth data element. In this example, the first and third data elements are defined data elements and the second and fourth data elements are dependent data elements. The set of data dependencies not only indicates which data elements are defined data elements or dependent data elements, but also which defined data elements are dependent on which dependent data elements.

In some embodiments, the compiler extracts a set of inter-operator dependencies based on the description of the neural network. The set of inter-operator dependencies may indicate an order of performance of the operators, such as which operators are performed prior to or subsequent to which operators. In one example, the set of inter-operator dependencies may indicate that a first operator is to be performed prior to a second operator, and that a second operator is to be performed prior to a third operator. In another example, the set of inter-operator dependencies may indicate that both a first operator and a second operator are to be performed prior to a third operator, and that the order of performance between the first operator and the second operator is not constrained.

In some embodiments, the compiler may generate a symbolic model for each of the operators. The symbolic model may be generated based on a nested loop associated with the operator. The symbolic model may include a loop order and a set of data dependencies determined based on the nested loop. In one example, if an operator contains two nested loops, then two different symbolic models may be generated for the operator. In another example, if an operator does not contain any nested loops, then no symbolic models may be generated for the operator.

In some embodiments, the compiler may analyze the symbolic models and the set of inter-operator dependencies to determine whether certain pairs of nested loops can be combined. In some instances, the compiler scans the symbolic models sequentially and determines whether a symbolic model meets a set of criteria with another symbolic model. The set of criteria may include criteria regarding loop orders, criteria regarding data dependencies, and criteria regarding the inter-operator dependencies. If each criteria is met for a particular pair of nested loops, then the compiler may combine the nested loops to form a combined nested loop and possibly a combined operator. The combined nested loop may include a reduced number of defined data elements and/or dependent data elements from the constituent sets of data dependencies. In some instances, a new symbolic model is generated for the combined nested loop, and the compiler continues to scan the symbolic models with the new symbolic model included.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example of a computational flow model 100 for a neural network. Neural networks take inspiration from the mechanics of the operation of the human brain. According to various models of the brain, the main computational element of the brain is the neuron. Neurons are connected together with a number of elements, with elements entering a neuron being referred to as dendrites and an element leaving a neuron being referred to as an axon. A neuron accepts signals via dendrites, performs a computation on the signals, and outputs a signal on an axon. The input and output signals are referred to as activations. The axon of one neuron can branch out and be connected to the dendrites of multiple neurons. The connection between a branch of an axon and a dendrite is called a synapse.

A synapse can scale the signal crossing the synapse. The scaling factor is referred to as a weight, and is thought of as the way a brain is able to learn: different weights result from different responses to input. Learning can change the weights, but the organization of the neurons and synapses need not change to obtain the learning. The static structure of the brain can thus be used as a model for a program, and the weights can reflect tasks that the program has learned to perform.

Neural networks operate on the notion that a neuron's computation involves a weighted sum of input values. These weighted sums correspond to the value scaling performed by the synapses and the combining of those values in the neuron. A functional operation is performed in the neuron on the combined inputs. In the brain model, the operation appears to be a non-linear function that causes the neuron to generate an output only when the inputs cross some threshold. Thus, by analogy, the nodes of a neural network can apply a non-linear function to the weighted sum of the values input into the nodes.

In the illustrated example, the model 100 includes an input layer 104, a middle layer that is often referred to as a hidden layer 106, and an output layer 108. Each layer includes some number of nodes 102. In this example, the nodes 102 of the input layer 104 are connected to each node 102 of the hidden layer 106. The connections, which would be referred to as synapses in the brain model, are referred to as weights 110. Also in this example, each node 102 of the hidden layer 106 has a connection or weight 110 with each node 102 of the output layer. The input layer 104 can receive inputs and can propagate the inputs to the hidden layer 106. A neural network implementation can include multiple hidden layers. Weighted sums computed by the hidden layer 106 (or multiple hidden layers) are propagated to the output layer 108, which can present final outputs to a user. The outputs of the nodes 102 can be referred to as activations, in keeping with the brain model.

An example of a computation that can occur at each layer in the example model 100 is as follows:

$$y_j = f\left(\sum_{i=1}^{3} W_{ij} \times x_i + b\right)$$

In the above equation, $W_{ij}$ is a weight, xi is an input activation, $y_j$ is an output activation, f( ) is a non-linear function, and b is a bias term. Various non-linear functions can be used to achieve different purposes.

The model 100 can be referred to as a directed, weighted graph. In a directed graph, each connection to or from a node indicates a direction (e.g., into the node or away from the node). In a weighted graph, each connection can have a weight. Tools for developing neural networks can visualize the neural network as a directed, weighted graph, for ease of understanding and debuggability. In some cases, these tools can also be used to train the neural network and output trained weight values. Executing the neural network is then a matter of using the weights to conduct computations on input data.

Neural networks with many layers can be capable of learning high-level features having more complexity and abstraction than shallower networks. As an example, a neural network can be taught to recognize images. In this example, pixels of an image can be fed into the input layer of the neural network, and the outputs of the first layer can indicate the presence of low-level features in the image, such as lines and edges. At subsequent layers, these features can be combined to measure the likely presence of higher level features: the lines can be combined into shapes, which can be further combined into sets of shapes. Given all this information, the neural network can output a probability that the high-level features represent a particular object or scene. For example, the neural network can output whether an image contains a cat or does not contain a cat.

The learning phase of a neural network is referred to as training the neural network. During training, the neural network is taught to perform a task. In learning the task, values for the weights (and possibly also the bias) are determined. The underlying program for the neural network (e.g., the organization of nodes into layers, the connections between the nodes of each layer, and the computation executed by each node), does not need to change during training. Once trained, the neural network can perform the task by computing a result using the weight values that were determined during training. For example, the neural network can output the probability that an image contains a particular object, can output the probability that an audio sequence contains a particular word, can generate a bounding box around an object in an image, or can propose an action that should be taken, etc. Running the program for the neural network is referred to as inference.

There are multiple ways in which weights can be trained. One method is called supervised learning. In supervised learning, all training samples are labeled, so that inputting each training sample into a neural network produces a known result. Another method is called unsupervised learning, where the training samples are not labeled and training aims to find a structure in the data or clusters in the data. Semi-supervised learning falls between supervised and unsupervised learning. In semi-supervised learning, a subset of training data is labeled. The unlabeled data can be used to define cluster boundaries and the labeled data can be used to label the clusters.

Figure 2:
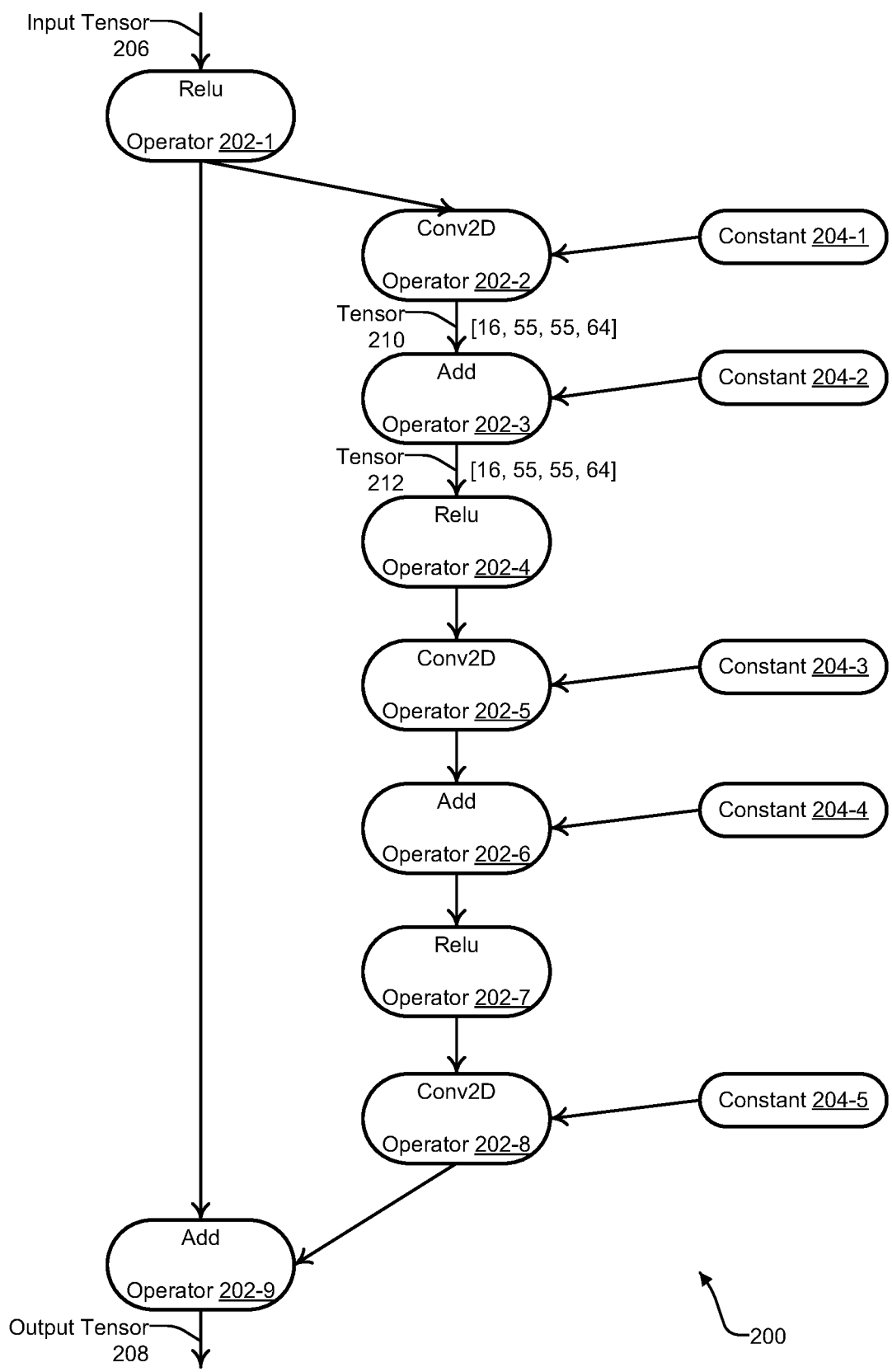
FIG. 2 illustrates an example graph of a neural network.

FIG. 2 illustrates an example graph 200 of a neural network having multiple operators 202 and multiple constants 204. The operators 202 and the constants 204 are interconnected by arrows which indicate the flow of data within the graph 200. Each of the operators 202 has an operator type, which include convolution ("Conv2D"), addition ("Add"), and activation ("ReLU").

The operator type determines what type of operation is performed on the data received by the operator, and whether a single input or two inputs are received by the operator. For example, an activation operation may be performed using a single input while the convolution and addition operations may be performed using two inputs. The dimensions of the constants 204 may be different depending on the type of operation that the constant feeds. For example, a constant that provides an input to a convolution operation (e.g., the constant 204-1) may be a multi-dimensional tensor, while a constant that provides an input to an addition operation (e.g., the constant 204-2) may be a multi-dimensional tensor or a single value.

In the illustrated example, an input tensor 206 is received by the operator 202-1 and an output tensor 208 is outputted by the operator 202-9. In the middle of the graph 200, an intermediate tensor 210 is received by the operator 202-3, which is an addition operator. The operator 202-3 adds the tensor 210 to the constant provided by the constant 204-2. The resulting sum is outputted by the operator 202-3 as an intermediate tensor 212, which is provided as an input to the operator 202-4, which is an activation operator. The dimensions of both of the tensors 210 and 212 are shown as being [16, 55, 55, 64].

FIG. 3 illustrates an example of a textual representation of the graph 200 for the operators 202-3 and 202-4. In the illustrated example, the compiler may identify a nested loop 302-1 associated with the operator 202-3 and a nested loop 302-2 associated with the operator 202-4.

The nested loop 302-1 includes four loops and a set of operations that are performed within the inner loop. The outer loop iterates over a range of values including the integers between 1 and 16, where W is the index. The next intermediate loop iterates over a range of values including the integers between 1 and 55, where X is the index. The next intermediate loop iterates over a range of values including the integers between 1 and 55, where Y is the index. The inner loop iterates over a range of values including the integers between 1 and 64, where Z is the index. Within the inner loop, a second data element ("Data 2") is defined based on a first data element ("Data 1"), a fourth data element ("Data 4") is defined based on a third data element ("Data 3"), a fifth data element ("Data 5") is defined based on Data 2 and Data 4, a sixth data element ("Data 6") is defined based on Data 5, and Data 6 is stored in memory.

The compiler may analyze the nested loop 302-1 to determine a set of data dependencies for the nested loop 302-1. The set of data dependencies may include indicators that Data 2, Data 4, Data 5, and Data 6 are defined data elements and that Data 1, Data 3, Data 4, and Data 5 are dependent data elements. The set of data dependencies may further include indicators that Data 2 is defined based on Data 1, Data 4 is defined based on Data 3, Data 5 is defined based on Data 2 and Data 4, and Data 6 is defined based on Data 5. The set of data dependencies may further include indicators that Data 2 is defined prior to Data 4, Data 5, and Data 6, that Data 4 is defined prior to Data 5 and Data 6, and that Data 5 is defined prior to Data 6.

The nested loop 302-2 also includes four loops and a set of operations that are performed within the inner loop. The outer loop iterates over a range of values including the integers between 1 and 16, where W is the index. The next intermediate loop iterates over a range of values including the integers between 1 and 55, where X is the index. The next intermediate loop iterates over a range of values including the integers between 1 and 55, where Y is the index. The inner loop iterates over a range of values including the integers between 1 and 64, where Z is the index. Within the inner loop, Data 6 is read from memory, a seventh data element ("Data 7") is defined based on Data 6, an eighth data element ("Data 8") is defined based on Data 7, and a ninth data element ("Data 9") is defined based on Data 8.

The compiler may analyze the nested loop 302-2 to determine a set of data dependencies for the nested loop 302-2. The set of data dependencies may include indicators that Data 7, Data 8, and Data 9 are defined data elements and that Data 6, Data 7, and Data 8 are dependent data elements. The set of data dependencies may further include indicators that Data 7 is defined based on Data 6, Data 8 is defined based on Data 7, and Data 9 is defined based on Data 8. The set of data dependencies may further include indicators that Data 7 is defined prior to Data 8, and that Data 8 is defined prior to Data 9.

FIG. 4 illustrates an example of a textual representation for a combined operator 402 formed by combining the operators 202-3 and 202-4 (or similarly, by combining the nested loops 302-1 and 302-2). The compiler may analyze a symbolic model associated with the operator 202-3 and a symbolic model associated with the operator 202-4 to determine that the nested loops 302-1 and 302-2 associated with the operators 202-3 and 202-4 are combinable. When the nested loops 302-1 and 302-2 are combined, the set of operations performed by each of the nested loops 302-1 and 302-2 are combined within a single fused nested loop 404. In some instances, the set of operations performed by the fused nested loop 404 may optionally be reduced such that the number of operations performed by the fused nested loop 404 is fewer than the sum of the number of operations performed by the nested loops 302-1 and 302-2.

In the illustrated example, the fourth operation performed by the nested loop 302-1 (i.e., defining Data 6 based on Data 5) is combined with the second operation of the nested loop 302-2 (i.e., defining Data 7 based on Data 6) and the third operation of the operator 202-4 (i.e., defining Data 8 based on Data 7) to form a new operation, which is defining Data 8 based on Data 5. Alternatively, the fourth operation performed by the nested loop 302-1 may be combined only with the second operation of the nested loop 302-2 to form a new operation, which would be defining Data 7 based on Data 5. Other possibilities are contemplated.

By combining the nested loops 302-1 and 302-2, the operations to store and read Data 6 are eliminated, causing the number of memory references to be significantly reduced. Specifically, the fifth operation performed by the nested loop 302-1 to store Data 6 and the first operation performed by the nested loop 302-2 to read Data 6 can be eliminated in the combined operator 402 and the fused nested loop 404. In one specific implementation, eliminating these operations saves over 6 million memory references along with 12 million bytes of memory.

Such methods for reducing or eliminating data movement in a neural network are further described below. The tensor accesses with element-wise load and store instructions inside nested loops can be expressed as follows:

$$v_l = t_m[f(i)] \text{ (load)}$$

$$t_m[f(i))] = v_s \text{ (store)}$$

In these definitions, $i = i_0, i_1, \ldots, i_n$ is the loop indices in the nested loop with depth n, where is the loop index of the loop at level j in the nested loop. $t_m$ represents the m-dimensional tensor which is being read/written by the load/store instruction. Meanwhile, $f(i) = f_0(i), f_1(i), \ldots, f_m(i)$ calculates the m-dimensional addresses of tensor element in $t_m$ that the load/store instruction is going to read/write, where $f_j(i)$ calculates the index of tensor $t_m$ at the j-th dimension. Specifically, $f_j(i_0, i_1, \ldots, i_n)$ is an affine expression of loop indices $i_0, i_1, \ldots, i_n$: $f_j(i_0, i_1, \ldots, i_n) = \Sigma_{k=0}^n c_k \times i_k + c_{n+1}$, where $c_k$ is the compile time constant. $v_l$ in (load) represents the result of the load instruction, and $v_s$ in (store) represents the data that is to be written to $t_m[f(i)]$ in the store instruction.

The data-movement elimination tries to eliminate the pair of instructions $(v = t_l[f_1(i)], t_s[f_s(i)] = v)$, where the result of the load instruction, i.e. v, directly feeds to the input of the store instruction. Such a pattern in a deep learning network is typically generated by operators such as repeat, tile, split, transpose, strided slice, etc., and combinations thereof. Such operators may rearrange the data without directly contributing to computing the final output of the neural network, and may consume memory bandwidth for both on chip and off chip memories which may slowdown the real computations.

In order to eliminate such pairs, the reverse of $f_s$ is calculated as $f_s'$. With $f_s'$, a new function $g_{ls}$ is built to map the indices space of tensor $t_s$ to indices space of tensor $t_l$ as follows:

$$g_{ls} = f_l \circ f_s' = f_l(f_s'(t_s))$$

With $g_{ls}$, the memory accesses that read $t_s$ may be rewritten to make them skip $t_s$ and directly read $t_l$ instead. As a result, the movement of data from $t_l$ to $t_s$ can be eliminated, thereby reducing the number of memory accesses. Specifically, for each load instruction that reads $t_s$: $v' = t_s[f_l'(i')]$, a new function is built as follows:

$$g' = g_{ls} \circ f_l' = g_{ls}(f_l'(i')) = f_l(f_s'(f_l'(i')))$$

With g', the loop indices i' are able to be mapped to the indices space of $t_l$. As a result, the load instruction v' can be rewritten as $v' = t_l[g'(i')]$. Once the transformation is applied for all load instructions that read tensor $t_s$, $t_s$ is not used anymore and $t_s$ and the data-movement that produce $t_s$ can be eliminated in the neural network. The process can be applied iteratively until no more load/store pairs can be eliminated.

FIG. 5 illustrates an example of various steps that may be performed to generate symbolic models 502-1 and 502-2 associated with the operators 202-3 and 202-4, respectively. The compiler may generate the symbolic model 502-1 associated with the operator 202-3 by determining a loop order 504-1 and a set of data dependencies 506-1 based on the nested loop 302-1. The loop order 504-1 may include the indices W, X, Y, and Z, as well as the order associated with the indices, e.g., that W corresponds to the outer loop, X corresponds to the first intermediate loop, Y corresponds to the second intermediate loop, and Z corresponds to the inner loop. The loop order 504-1 may further include the ranges associated with the indices (e.g., 1 to 16, 1 to 55, 1 to 55, and 1 to 64, respectively). The set of data dependencies 506-1 is described in reference to FIG. 3. The symbolic model 502-1 is generated by the compiler to include the loop order 504-1 and the set of data dependencies 506-1.

The compiler may generate the symbolic model 502-2 associated with the operator 202-4 by determining a loop order 504-2 and a set of data dependencies 506-2 based on the nested loop 302-2. The loop order 504-2 may include the indices W, X, Y, and Z, as well as the order associated with the indices, e.g., that W corresponds to the outer loop, X corresponds to the first intermediate loop, Y corresponds to the second intermediate loop, and Z corresponds to the inner loop. The loop order 504-2 may further include the ranges associated with the indices (e.g., 1 to 16, 1 to 55, 1 to 55, and 1 to 64, respectively). The set of data dependencies 506-2 is described in reference to FIG. 3. The symbolic model 502-2 is generated by the compiler to include the loop order 504-2 and the set of data dependencies 506-2.

Figure 6:
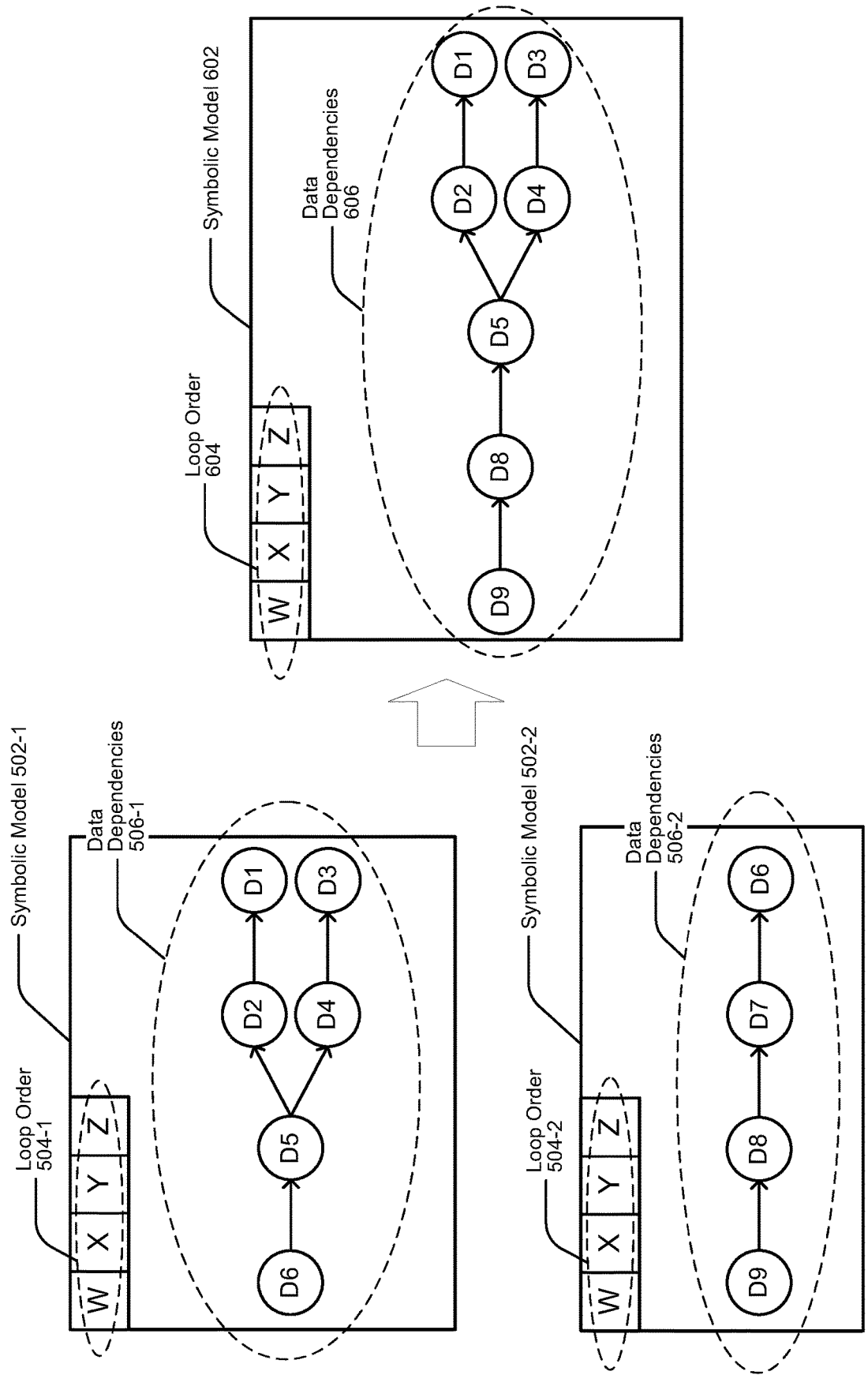
FIG. 6 illustrates an example of various steps that may be performed to compare symbolic models to determine whether two neural network operators are combinable.

FIG. 6 illustrates an example of various steps that may be performed to compare symbolic models 502-1 and 502-2 to determine whether the nested loops 302-1 and 302-2 are combinable. In various embodiments, the compiler may determine whether the nested loops 302-1 and 302-2 are combinable by determining whether the loop order 504-1 is combinable with the loop order 504-2 and/or by determining whether the set of data dependencies 506-1 is combinable with the set of data dependencies 506-2.

In some embodiments, the compiler may determine that the loop order 504-1 is combinable with the loop order 504-2 if and only if the indices are identical. In other embodiments, the compiler may determine that the loop order 504-1 is combinable with the loop order 504-2 if and only if the orders associated with the indices are identical. In other embodiments, the compiler may determine that the loop order 504-1 is combinable with the loop order 504-2 if and only if the ranges of the indices are identical. In some embodiments, the compiler may determine that the loop order 504-1 is combinable with the loop order 504-2 if the indices are identical, the orders associated with the indices are identical, and the ranges of the indices are identical. In some embodiments, the compiler may determine that the loop order 504-1 is combinable with the loop order 504-2 if the indices are identical, the orders associated with the indices are identical, or the ranges of the indices are identical. Other possibilities are contemplated.

In some embodiments, the compiler may determine that the set of data dependencies 506-1 is combinable with the set of data dependencies 506-2 if the defined data elements of the set of data dependencies 506-1 (e.g., Data 2, Data 4, Data 5, and Data 6) do not have any data elements in common with the dependent data elements of the set of data dependencies 506-2 (e.g., Data 6, Data 7, and Data 8). In some embodiments, the compiler may determine that the set of data dependencies 506-1 is combinable with the set of data dependencies 506-2 if the defined data elements of the set of data dependencies 506-1 (e.g., Data 2, Data 4, Data 5, and Data 6) do not have any data elements in common with all the data elements of the set of data dependencies 506-2 (e.g., Data 6 to Data 9). In some embodiments, the compiler may determine that the set of data dependencies 506-1 is combinable with the set of data dependencies 506-2 if all the data elements of the set of data dependencies 506-1 (e.g., Data 1 to Data 6) do not have any data elements in common with all the dependent data elements of the set of data dependencies 506-2 (e.g., Data 6 to Data 9).

Upon determining that the nested loops 302-1 and 302-2 are combinable based on the analysis of the symbolic models 502-1 and 502-2, the compiler may combine the nested loops 302-1 and 302-2 to generate the fused nested loop 404 and possibly to generate the new combined operator 402. The compiler may also generate a symbolic model 602 associated with the fused nested loop 404 by determining a loop order 604 and a set of data dependencies 606 based on the fused nested loop 404. The loop order 604 may be identical to one or both of the loop orders 504-1 and 504-2. For example, the loop order 604 may include the indices W, X, Y, and Z, as well as the order associated with the indices, e.g., that W corresponds to the outer loop, X corresponds to the first intermediate loop, Y corresponds to the second intermediate loop, and Z corresponds to the inner loop. The loop order 604 may further include the ranges associated with the indices (e.g., 1 to 16, 1 to 55, 1 to 55, and 1 to 64, respectively).

The set of data dependencies 606 may include indicators that Data 2, Data 4, Data 5, Data 8, and Data 9 are defined data elements and that Data 1, Data 2, Data 3, Data 4, Data 5, and Data 8 are dependent data elements. The set of data dependencies 606 may further include indicators that Data 2 is defined based on Data 1, Data 4 is defined based on Data 3, Data 5 is defined based on Data 2 and Data 4, Data 8 is defined based on Data 5, and Data 9 is defined based on Data 8. The symbolic model 602 is generated by the compiler to include the loop order 604 and the set of data dependencies 606.

Figure 7A:
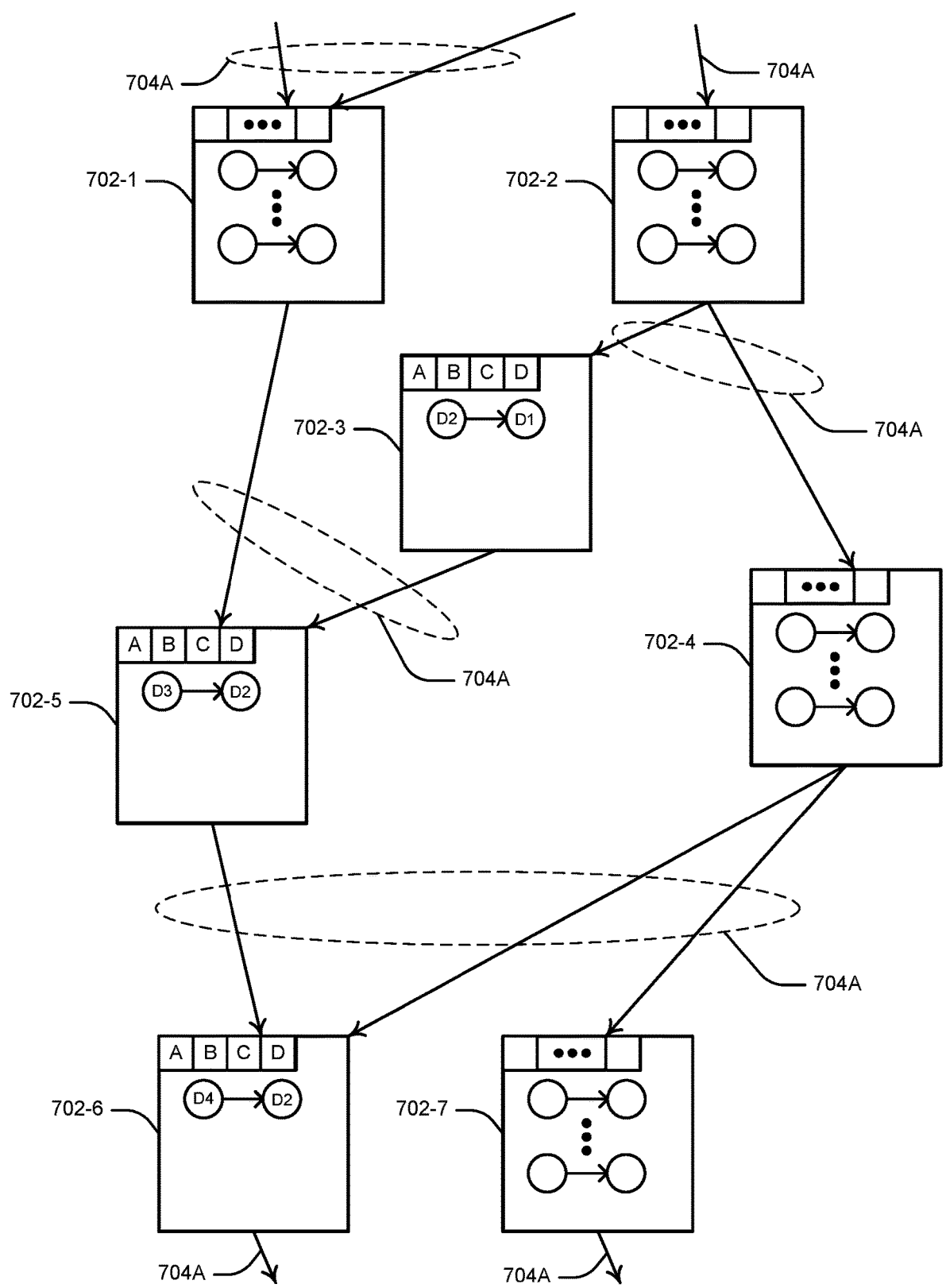
FIGS. 7A and 7B illustrate examples of various steps that may be performed to determine whether two neural network operators are combinable based on inter-operator dependencies.
Figure 7B:
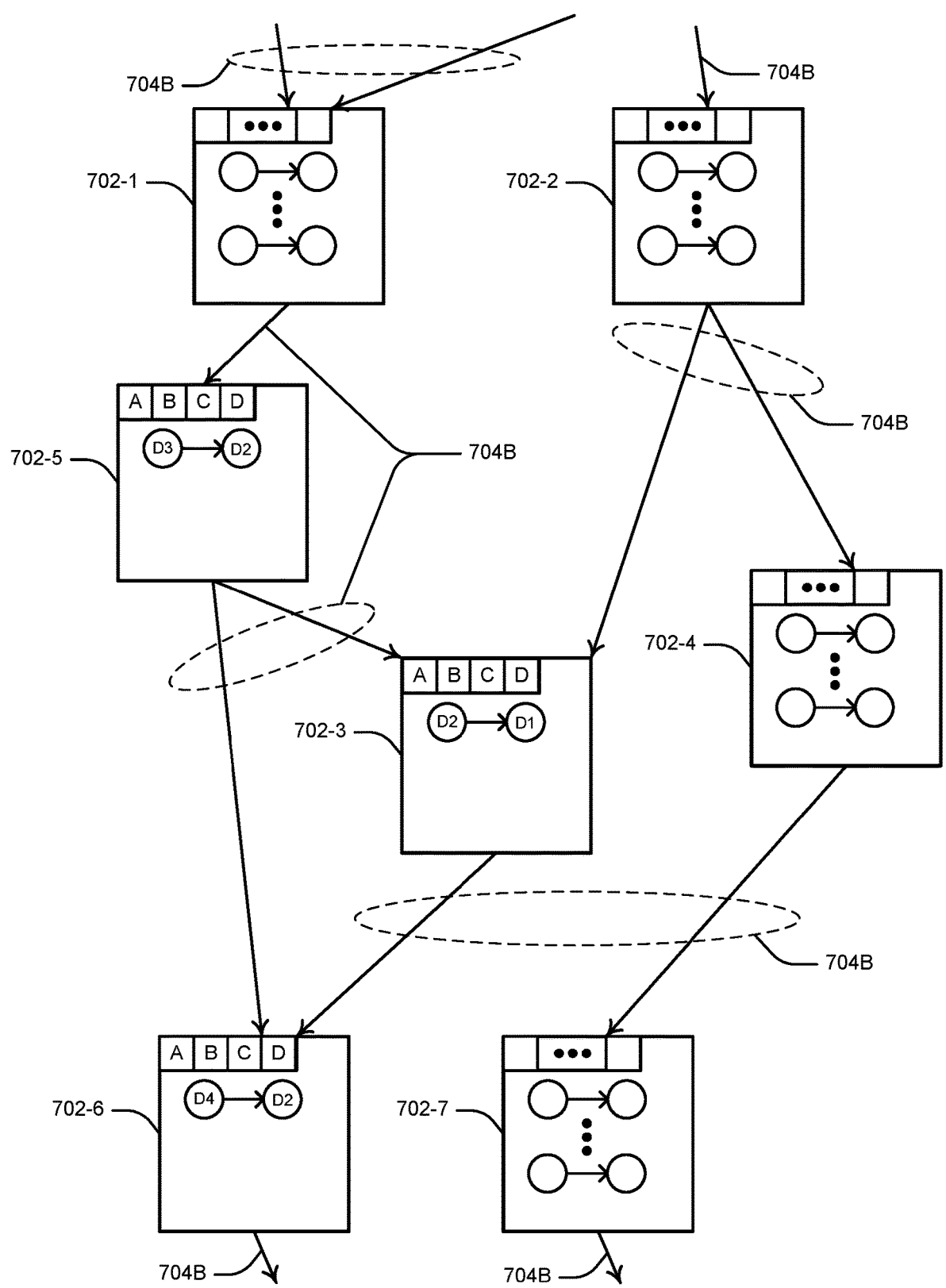

FIGS. 7A and 7B illustrate examples of various steps that may be performed to determine whether two nested loops are combinable based on inter-operator dependencies. In some embodiments, the compiler may extract a set of inter-operator dependencies 704 based on the description of the neural network. The set of inter-operator dependencies 704 may indicate an order of performance of the operators and similarly the relationships between the symbolic models 702 associated with the operators. In some embodiments, the set of inter-operator dependencies 704 indicate the data paths between operators, such as which operators generate an output and provide that output as an input for which operators. For example, the set of inter-operator dependencies 704 may indicate the arrangement of arrows in a graph of a neural network, and therefore the flow of data within the graph.

In reference to FIG. 7A, the compiler may extract the set of inter-operator dependencies 704A based on a description of a neural network. The set of inter-operator dependencies 704A may indicate that an operator associated with the symbolic model 702-3 is performed prior to the operator associated with the symbolic model 702-5, and that the operator associated with the symbolic model 702-5 is performed prior to the operator associated with the symbolic model 702-6.

In one example, the compiler may analyze the symbolic models 702-3, 702-5, and 702-6 and the set of inter-operator dependencies 704A to determine that the nested loop associated with the symbolic model 702-5 is combinable with the nested loop associated with the symbolic model 702-6. Specifically, the compiler may determine that the dependent data elements of the set of data dependencies of the symbolic model 702-6 (e.g., Data 2) do not share a data element in common with the defined data elements of the set of data dependencies of the symbolic model 702-5 (e.g., Data 3). Furthermore, the compiler may determine that, while the dependent data elements of the set of data dependencies of the symbolic model 702-6 (e.g., Data 2) share a data element in common with the defined data elements of the set of data dependencies of the symbolic model 702-3 (e.g., Data 2), the inter-operator dependencies 704A indicate that the operator associated with the symbolic model 702-3 is performed prior to the operator associated with the symbolic model 702-5. Based on the symbolic models 702-3, 702-5, and 702-6 and the set of inter-operator dependencies 704A satisfying these criteria, the compiler may determine that the nested loops associated with the symbolic models 702-5 and 702-6 are combinable.

FIG. 7B illustrates an alternative example in which the symbolic models 702 are the same as the example of FIG. 7A but the inter-operator dependencies are different. The set of inter-operator dependencies 704B indicate that the operator associated with the symbolic model 702-5 is performed prior to the operators associated with the symbolic models 702-3 and 702-6, and that the operator associated with the symbolic model 702-3 is performed prior to the operator associated with the symbolic model 702-6. In this example, the compiler may analyze the symbolic models 702-3, 702-5, and 702-6 and the set of inter-operator dependencies 704B to determine that the nested loop associated with the symbolic model 702-5 is not combinable with the nested loop associated with the symbolic model 702-6. Specifically, the compiler may determine that the dependent data elements of the set of data dependencies of the symbolic model 702-6 (e.g., Data 2) share a data element in common with the defined data elements of the set of data dependencies of the symbolic model 702-3 (e.g., Data 2), which may, in some embodiments, prevent combining the nested loops associated with symbolic models 702-5 and 702-6.

Figure 8:
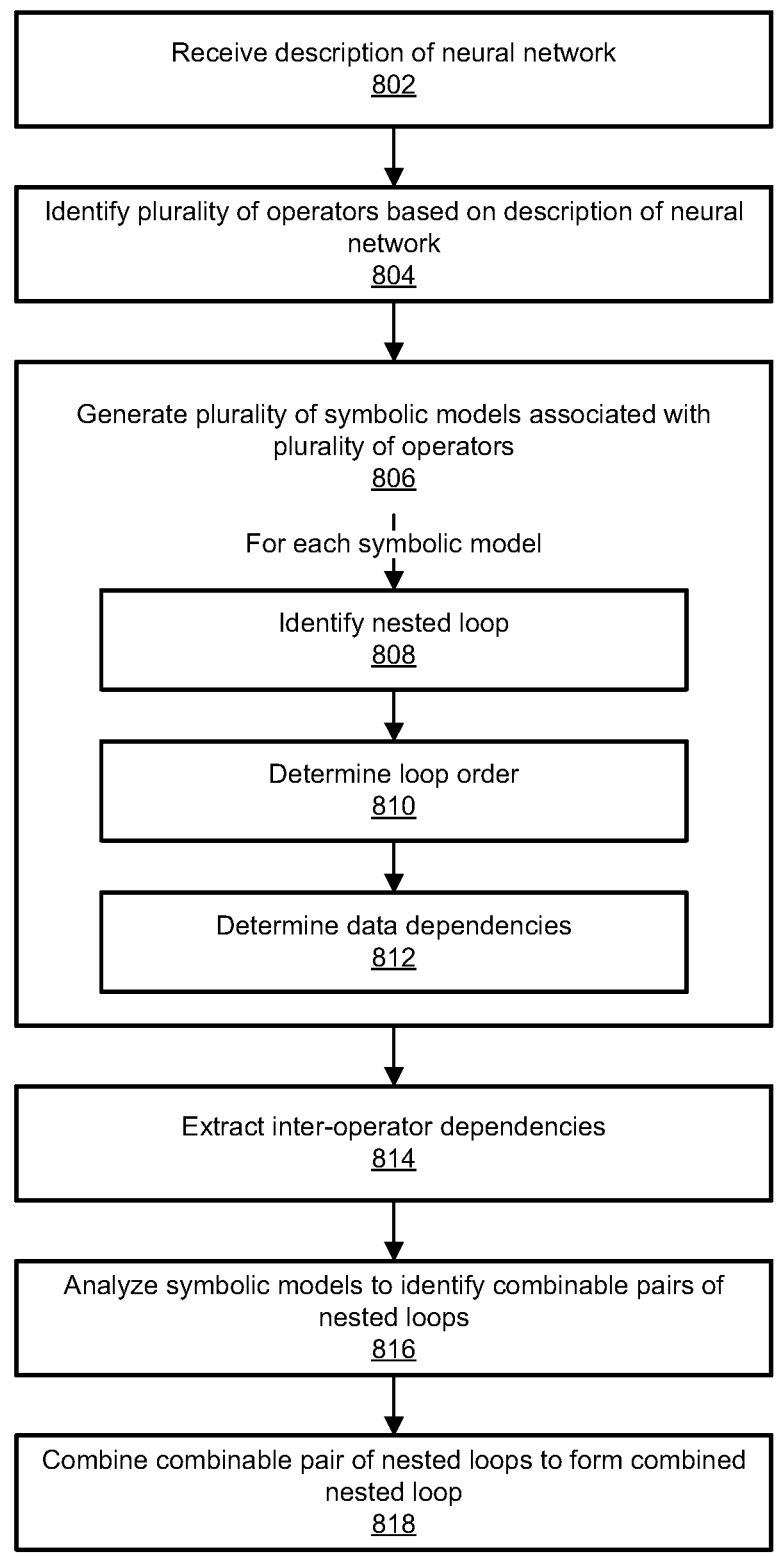
FIG. 8 includes a flowchart illustrating an example of a method of reducing iterations associated with a neural network.

FIG. 8 includes a flowchart illustrating an example of a method 800 of accelerating a neural network by, in some examples, reducing the number of iterations associated with the neural network. One or more steps of the method 800 may be performed in a different order than the illustrated example, and one or more steps of the method 800 may be omitted during the performance of the method 800. One or more steps of the method 800 may be performed by a compiler running on a host processor.

At step 802, a description of the neural network is received. In some embodiments, the description of the neural network is received by a compiler.

At step 804, a plurality of operators is identified based on the description of the neural network. In some embodiments, the plurality of operators is identified by the compiler. In some embodiments, the plurality of operators includes a first operator and a second operator.

At step 806, a plurality of symbolic models associated with the plurality of operators is generated. In some embodiments, the plurality of symbolic models is generated by the compiler. In some embodiments, a first symbolic model associated with the first operator is generated. In some embodiments, a second symbolic model associated with the second operator is generated.

In some embodiments, performing step 806 includes performing steps 808, 810, and/or 812 for each symbolic model of the plurality of symbolic models. In some embodiments, performing step 806 includes performing steps 808, 810, and/or 812 for each operator of the plurality of operators for which a symbolic model is generated.

At step 808, a nested loop associated with the operator is identified. In some embodiments, the nested loop is identified by the compiler. In some embodiments, a first nested loop associated with the first operator is identified. In some embodiments, a second nested loop associated with the second operator is identified.

At step 810, a loop order for the symbolic model is determined (e.g., defined) based on the nested loop. In some embodiments, the loop order is determined by the compiler. In some embodiments, a first loop order for the first symbolic model is determined. In some embodiments, a second loop order for the second symbolic model is determined.

At step 812, a set of data dependencies for the symbolic model is determined (e.g., defined) based on the nested loop. In some embodiments, the set of data dependencies is determined by the compiler. In some embodiments, a first set of data dependencies for the first symbolic model is determined. In some embodiments, a second set of data dependencies for the second symbolic model is determined.

At step 814, a set of inter-operator dependencies is extracted based on the description of the neural network. In some embodiments, the set of inter-operator dependencies is extracted by the compiler. In some embodiments, the set of inter-operator dependencies may include an indication that the first operator is performed prior to the second operator.

At step 816, the plurality of symbolic models and the set of inter-operator dependencies are analyzed to identify a combinable pair of nested loops. In some embodiments, the combinable pair of nested loops is identified by the compiler. In some embodiments, the first symbolic model, the second symbolic model, and the set of inter-operator dependencies are analyzed to determine that the first nested loop is combinable with the second nested loop. In some embodiments, determining that the first nested loop is combinable with the second nested loop includes determining that the first loop order is combinable with the second loop order. In some embodiments, determining that the first nested loop is combinable with the second nested loop includes determining that the first set of data dependencies is combinable with the second set of data dependencies.

At step 818, the combinable pair of nested loops are combined to form a combined nested loop. In some embodiments, the combinable pair of nested loops are combined by the compiler. In some embodiments, a combined operator is also formed that corresponds to the combined nested loop. After forming the combined nested loop, a symbolic model for the combined nested loop may be generated, which may be referred to as a third symbolic model.

The third symbolic model may be added to the plurality of symbolic models and may be considered by the compiler when searching for additional combinable pairs of nested loops. In one example, the compiler may again analyze the plurality of symbolic models (now including the third symbolic model) to identify a second combinable pair of nested loops. One of the nested loops of the second combinable pair of nested loops may include the combined nested loop associated with the third symbolic model. The compiler may then combine the second combinable pair of nested loops to form a second combined nested loop, and may generate a symbolic model for the second combined nested loop. The process may continue until all combinable pairs of nested loops have been identified.

Figure 9:
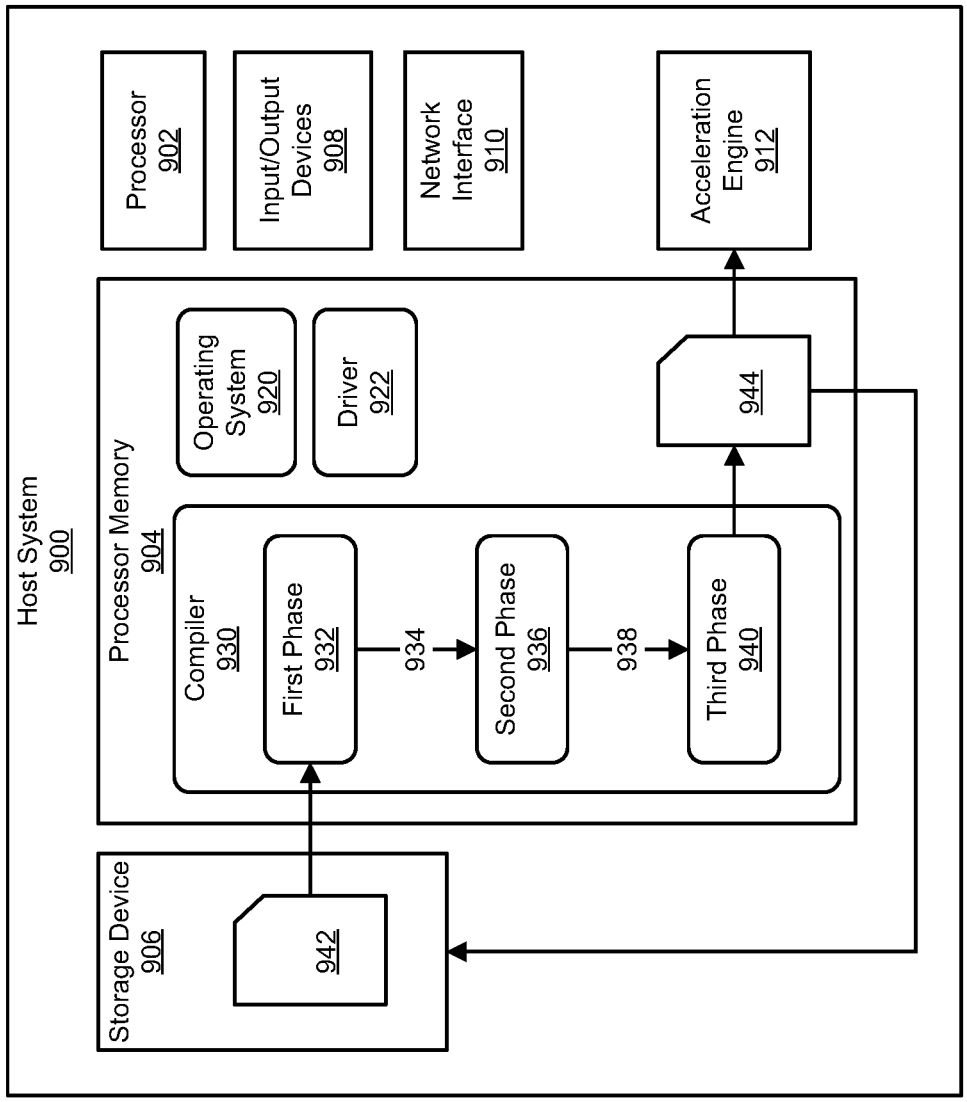
FIG. 9 includes a block diagram that illustrates an example of a host system.

FIG. 9 includes a block diagram illustrating an example of a host system 900 on which a compiler, such as is described herein, can run. The illustrated host system 900 is an example of a computing device, and includes a processor 902, a processor memory 904, at least one storage device 906, various Input/Output (I/O) devices 908, and at least one network interface 910. In the example of FIG. 9, the host system 900 also includes an acceleration engine 912, which is an integrated circuit device that can accelerate certain operations or computations performed by the host system 900. In various examples, the host system 900 can be implemented as a server in a data center, a desktop computer, a laptop computer, a tablet computer, or a smartphone, among other examples. In some examples, operations or components discussed below as performed or included in the host system 900 can be performed or included in other computer devices. For example, the compiler 930 can execute on the host system 900 while the acceleration engine 912 is located at a different host system.

The processor 902 is an integrated circuit device that can execute program code, in the form of instructions. The program code can be used for various software applications or tools, such as an operating system 920 or the illustrated compiler 930. While the processor 902 is executing a program, the instructions for the program can be stored in the processor memory 904. The instructions can also be stored elsewhere, such as on the storage device 906, and can be loaded into the processor memory 904 when needed by the processor 902. The processor 902 can also use the processor memory 904 for temporary storage of other data on which the processor 902 is operating. In various examples, the processor memory 904 is a volatile memory type, such as a type of Random Access Memory, though non-volatile memory types can, alternatively or additionally, be used for the processor memory 904.

The storage device 906 is an example of a device that can include non-volatile memory. For example, the storage device 906 can be a magnetic disk drive, a solid state drive, or an optical drive, among other examples. The storage device 906 can further be non-transitory, such that program code and other data stored on the storage device 906 remains present when the storage device 906 is not powered on.

The storage device 906 is one example of a peripheral device, which are components that can be coupled to the host system 900 to add functionality to the host system 900. Other examples of peripheral devices include the Input/Output devices 908 and the network interface 910. The Input/Output devices 908 can include user input and output devices, such as keyboards, mice, touch screens, microphones, display screens, speakers, printers, and scanners, among other examples. The network interface 910, which can be implemented using a network interface card, can provide access to one or more networks. The network interface 910 can include, for example, a physical port for connecting a network cable and/or wireless antennas for communicating with Wi-Fi and/or cellular networks. The network interface 910 can also be described as an I/O device.

The acceleration engine 912 is also another type of peripheral device or I/O device. The acceleration engine 912 is a device that is purpose built to perform certain operations that can be performed by the processor 902, but can be performed faster by the acceleration engine 912. For example, the acceleration engine 912 can be a neural network accelerator, and, as such, may be able to perform the large scale, parallel computations of a neural network more efficiently than when the computations are performed by the processor 902. As another example, the acceleration engine 912 can be a GPU, and may be optimized to perform the computations needed for graphics rendering. Other examples of devices that can be implemented by the acceleration engine 912 include cryptographic accelerators, compression and decompression accelerators, 3-D accelerators, regular expression accelerators, security accelerators, and others.

In various examples, the acceleration engine 912 can execute program code to perform certain operations. For example, when the acceleration engine 912 is a neural network accelerator, the acceleration engine 912 can be programmed to execute a particular neural network, such as one that performs image recognition or one that performs machine translation. As a further example, to support the execution of a neural network, the acceleration engine 912 can be programed to perform operations such as copying data for the neural network from processor memory 904 (for example) into the acceleration engine 912, copying input data for the neural network from processor memory 904 into the acceleration engine 912, and/or copying results from the acceleration engine 912 into the processor memory 904, among other examples.

To generate program code for the acceleration engine 912, in various examples, the host system 900 can execute the compiler 930. Compilers, in general, are software programs that translate program code written in a human-readable language into a format (e.g., machine instructions) that can be read and processed by an integrated circuit device. In the example of FIG. 9, the acceleration engine 912 is a neural network accelerator and the compiler 930 is for compiling a neural network description into instructions to be executed on the acceleration engine 912. When the acceleration engine 912 implements a different type of accelerator, another compiler can be used.

The compiler 930 can be activated, for example, when the operating system 920 receives keyboard, mouse, touchscreen, voice commands, or other inputs from the Input/Output devices 908. The inputs can further include parameters for the compiler 930, such as the input code 942 to compile and configuration options for the compilation process. Once the compiler 930 is activated, the processor 902 can load the instructions for the compiler 930 into the processor memory 904, and can execute the instructions.

In the example of FIG. 9, the compiler 930 includes a first stage 932, a second stage 936, and a third stage 940, which each perform different operations to produce compiled code 944. In other examples, the compiler 930 can combine the operations of the first stage 932, second stage 936, and/or third stage 940 into fewer stages, or can divide the operations of one of the stages into multiple stages.

The first stage 932 can receive and process input code 942. The input code 942 can describe a program in a high-level programming language, such as Java, C++, or Tensorflow, among many other examples. The input code 942 can describe, for example, steps to perform image recognition, speech recognition, machine translation, or other operations. The input code 942 can be obtained, for example, from the storage device 906. Alternatively, though not illustrated here, the input code 942 may be located in the processor memory 904 or can be obtained from a network location, using the network interface 910. Processing of the input code 942 can include sorting the operations described in the input code 942 into layers, where the outputs of one layer provide the inputs to a next layer. Processing can also include identifying steps to be performed by the processor 902, rather than by the acceleration engine 912. For example, the processor 902, through the execution of a driver 922, may need to perform steps such as configuring Direct Memory Access (DMA) descriptors for moving data into or out of the acceleration engine 912, among other examples.

The output 934 of the first stage 932 can be organized, for example, in the layers, nodes, and connections between nodes of a neural network. The second stage 936 can perform intermediate processing on this output 934. For example, the operations performed in any one layer, or at any one node in a layer, may be too many for the acceleration engine 912 to perform at the same time. The acceleration engine 912 may, for example, have a limited amount of local storage space for the data needed for a computation, or the computations may be more than the acceleration engine 912 can perform at one time. In this example, the first stage 932 can break the operations of the layer or node down into smaller operations, which can fit into the acceleration engine's local memory and/or can fit into the computing capacity of the acceleration engine 912. Processing of the output 934 of the first stage 932 can include other steps, such as scheduling, or determining the order in which the acceleration engine 912 and/or processor 902 will perform operations, among other examples.

In various examples, the output 938 of the second stage 936 includes the various steps to be performed by components of the acceleration engine 912, in the order that the steps are to be performed. The output 938 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 940 can operate on the output 938 of the second stage 936, and perform various steps before producing the instructions that are to be executed by the acceleration engine 912. These steps can include, for example, removing redundant dependencies, resolving or handling dependencies between nodes by inserting synchronization instructions into the code, identifying possible optimizations in memory usage or memory bandwidth usage, and other operations.

The output of the third stage 940 is compiled code 944, which may include machine instructions in binary format. In some examples, the compiled code 944 can be stored in the processor memory 904. Alternatively or additionally, the compiled code 944 can be copied to the storage device 906 or to a network location. As noted above, the acceleration engine 912 may be located at a different host system, in which case the compiled code 944 can be sent over the network interface 910 to the other host system.

In the example of FIG. 9, the host system 900 can execute a driver 922, which can also be referred to as a device driver or runtime driver, that manages the acceleration engine 912. The driver 922 can provide an interface between applications executing on the host system 900 (or on another host system) and the acceleration engine 912. For example, the driver 922 can provide an Application Program Interface (API) that defines functions for feeding input data to the acceleration engine 912 and defining the operation to perform on the input data. In this and other examples, the driver 922 can configure the acceleration engine 912 to perform the operation. For example, the driver 922 can identify a neural network that the acceleration engine 912 is to execute, as well as the location in the processor memory 904 or on the storage device 906 where the compiled code 944 for the neural network is located. The driver 922 can further load into the acceleration engine 912 or cause the acceleration engine 912 to load the compiled code 944, can load or cause the acceleration engine 912 to load the input data on which the neural network is to operate, and/or can cause the acceleration engine 912 to begin executing on the input data. Once the acceleration engine 912 has finished, the acceleration engine 912 can notify the driver 922, and the driver 922 can deliver a result back to the application that requested the result.

Figure 10:
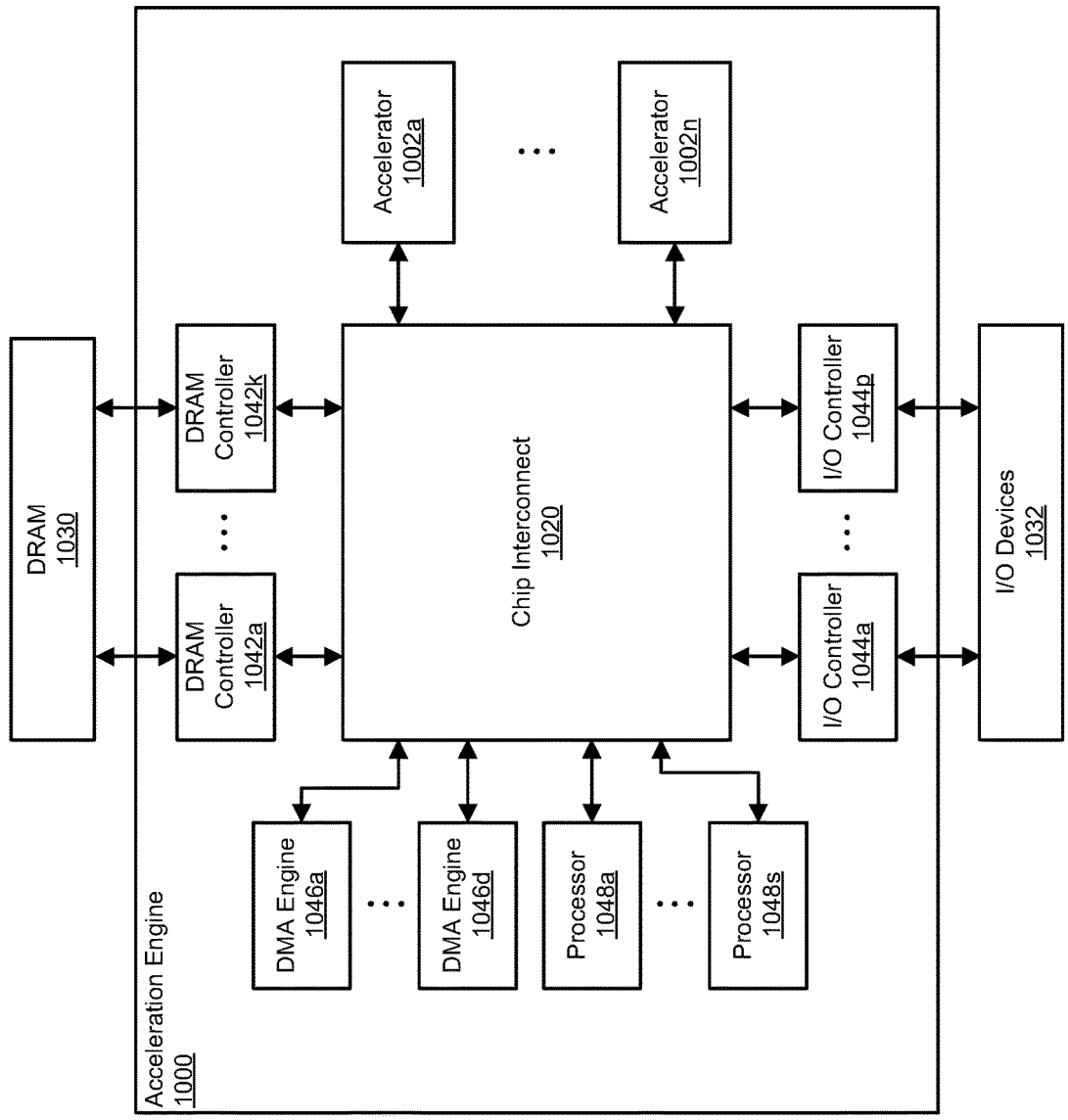
FIG. 10 includes a block diagram that illustrates an example of an acceleration engine.

FIG. 10 includes a block diagram that illustrates an example of an acceleration engine 1000. The acceleration engine 1000 is an example of an integrated circuit that can include one or more accelerators 1002a-1002n that may be similar to the accelerator illustrated in FIG. 11.

In the example of FIG. 10, the acceleration engine 1000 includes multiple accelerators 1002a-1002n, each of which can perform a set of operations. In various examples, the accelerators 1002a-1002n are for particular types of operations, so that the accelerators 1002a-1002n can perform the operations much faster than when similar operations are performed by a general purpose processor. In various examples, to perform a set of operations, input data on which the operations are to be performed must first be moved into the accelerators 1002a-1002n. Additionally, in some cases, program code is also moved into the accelerators 1002a-1002n, which programs the operations that the accelerators 1002a-1002n will perform on the data. In the illustrated example, the acceleration engine 1000 includes n accelerators 1002a-1002n. Examples of accelerators that can be included in the acceleration engine 1000 include graphics accelerators, floating point accelerators, neural network accelerators, and others. In various examples, the accelerators 1002a-1002n can each be the same (e.g., each of the is a graphics accelerator) or can be different (e.g., the accelerators 1002a-1002n include a graphics accelerator, a floating point accelerator, and neural network accelerator).

The example acceleration engine 1000 further includes DRAM controllers 1042a-1042k for communicating with an external memory. The external memory is implemented, in this example, using DRAM 1030. In the illustrated example, the acceleration engine 1000 includes k DRAM controllers 1042a-1042k, each of which may be able to communicate with an independent set of banks of DRAM. In other examples, other types of RAM technology can be used for the external memory. The DRAM controllers 1042a-1042k can also be referred to as memory controllers.

In various examples, input data and/or program code for the accelerators 1002a-1002n can be stored in the DRAM 1030. Different programs can cause the accelerators 1002a-1002n to perform different operations. For example, when one of the accelerators is a neural network accelerator, one program can configure the neural network accelerator to perform speech recognition while another program can configure the neural network accelerator to perform image recognition. In various examples, different accelerators 1002a-1002n can be programmed with different programs, so that each performs a different set of operations. In various examples, the processors 1048a-1048s can manage moving of program code from the DRAM 1030 to the accelerators 1002a-1002n.

The example acceleration engine 1000 further includes I/O controllers 1044a-1044p for communicating with I/O devices 1032 in the system. The acceleration engine 1000 can communicate with I/O devices over, for example, a processor bus. In some examples, the processor bus can be implemented using Peripheral Component Interconnect (PCI) and/or a variation of the PCI bus protocol. The processor bus can connect the acceleration engine 1000 to I/O devices such as, for example, input and output devices, memory controllers, storage devices, and/or network interface cards, among other things. In some examples, the I/O controllers 1044-1044p can enable the acceleration engine 1000 to act as an I/O device for a host processor. For example, the acceleration engine 1000 can be the recipient of input data from the host processor, and a command indicating an operation to be performed on the input data (e.g., a particular computation or analysis). In the illustrated example, the acceleration engine 1000 includes p I/O controllers 1044a-1044p, each of which may include a separate root complex and may communicate with a separate set of I/O devices 1032. In other examples, other standardized bus protocols, such as Ultra Path Interconnect (UPI) can be used for the host bus. In other examples, a proprietary bus protocol can be used.

Movement of data in the acceleration engine 1000 can be managed by one or more processors 1048a-1048s, which can also be referred to as data management processors. In the example of FIG. 10, the acceleration engine 1000 includes s processors 1048a-1048s incorporated into the device (e.g., on the same silicon die). In other examples, the processors 1048a-1048s can be external to the acceleration engine 1000 (e.g., on a different die and/or in a different package). In some examples, the processors 1048a-1048s can manage the movement of data from I/O devices 1032 to the accelerators 1002a-1002n or the DRAM 1030. For example, input data may be located at an I/O device 1032 or in processor memory, and the processors 1048a-1048s can move the input from the I/O device 1032 or processor memory into an accelerator or into DRAM 1030. As another example, program code for the accelerators 1002a-1002n may be located on an I/O device 1032 or in processor memory.

The example acceleration engine 1000 further includes DMA engines 1046a-1046d that can move data between the accelerators 1002a-1002n, DRAM controllers 1042a-1042k, and I/O controllers 1044a-1044p. In the illustrated example, the acceleration engine 1000 includes d DMA engines 1046a-1046d. In some implementations, the DMA engines 1046a-1046d can be assigned to specific tasks, such as moving data from the DRAM controllers 1042a-1042d to the accelerators 1002a-1002n, or moving data between the I/O controllers 1044a-1044p and the accelerators 1002a-1002n. These tasks can be assigned, for example, by enqueueing descriptors with the DMA engines 1046a-1046d, where a descriptor identifies an address for a block of data and an operation (e.g., a read or a write) to perform. A descriptor, for example, can direct a DMA engine to instruct a DMA controller to read a block of data from DRAM 1030. A descriptor can, as a further example, instruct the DMA engine to write data, read by the DMA controller, to an accelerator. Further descriptors can be used to move data from an accelerator to DRAM 1030.

In various examples, each of the processors 1048a-1048s can be responsible for managing the data movement for a different accelerator. In some examples, a processor may manage the data movement for more than one accelerator. Similarly, in various examples, each of the processors 1048a-1048s can be assigned to one or more DMA engines 1046a-1046d. In these and other examples, associations between processors 1048a-1048s, accelerators 1002a-1002n, and DMA engines 1046a-1046d are determined by program code being executed by each respective processor.

In the example acceleration engine 1000, the various components can communicate over a chip interconnect 1020. The chip interconnect 1020 primarily includes wiring for routing data between the components of the acceleration engine 1000. In some cases, the chip interconnect 1020 can include a minimal amount of logic, such as multiplexors to control the direction of data, flip-flops for handling clock domain crossings, and timing logic.

Figure 11:
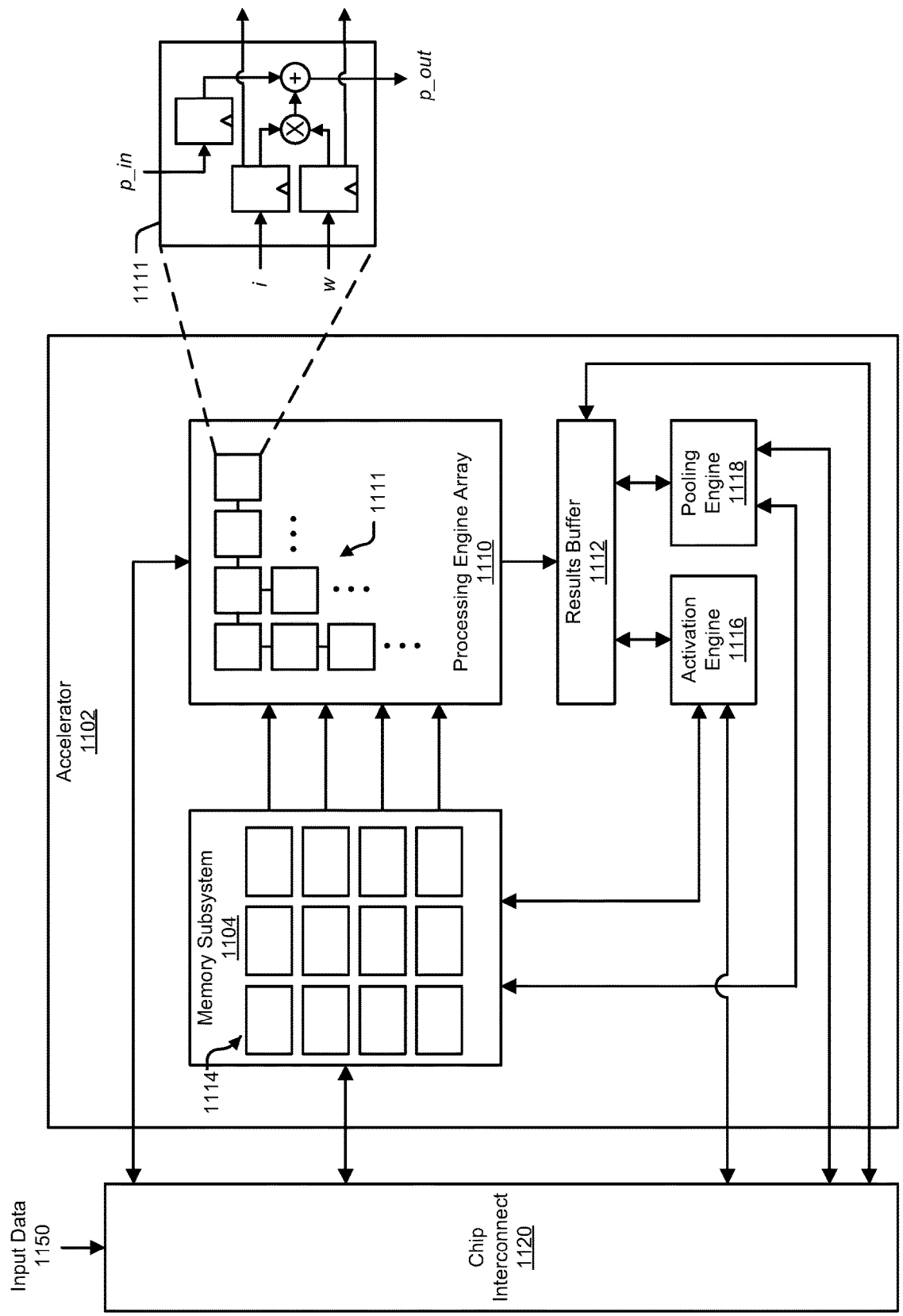
FIG. 11 is a block diagram illustrating an example of an integrated circuit device.

FIG. 11 is a block diagram illustrating an example of an integrated circuit device. The example of FIG. 11 illustrates an accelerator 1102. In various examples, the accelerator 1102, for a set of input data (e.g., input data 1150), can execute computations using a processing engine array 1110, an activation engine 1116, and/or a pooling engine 1118. In some examples, the example accelerator 1102 may be an integrated circuit component of a processor, such as a neural network processor. The processor may have other integrated circuit components, including additional accelerator engines.

In various implementations, the memory subsystem 1104 can include multiple memory banks 1114. In these implementations, each memory bank 1114 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1114. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1104 can permit simultaneous access to the read or write channels of multiple memory banks. As another example, the memory subsystem 1104 can include arbitration logic such that arbitration between, for example, the outputs of multiple memory banks 1114 can result in more than one memory bank's output being used. In these and other examples, though globally managed by the memory subsystem 1104, each memory bank can be operated independently of any other.

Having the memory banks 1114 be independently accessible can increase the efficiency of the accelerator 1102. For example, values can be simultaneously read and provided to each row of the processing engine array 1110, so that the entire processing engine array 1110 can be in use in one clock cycle. As another example, the memory banks 1114 can be read at the same time that results computed by the processing engine array 1110 are written to the memory subsystem 1104. In contrast, a single memory may be able to service only one read or write at a time. With a single memory, multiple clock cycles can be required, for example, to read input data for each row of the processing engine array 1110 before the processing engine array 1110 can be started.

In various implementations, the memory subsystem 1104 can be configured to simultaneously service multiple clients, including the processing engine array 1110, the activation engine 1116, the pooling engine 1118, and any external clients that access the memory subsystem 1104 over a communication fabric 1120. In some implementations, being able to service multiple clients can mean that the memory subsystem 1104 has at least as many memory banks as there are clients. In some cases, each row of the processing engine array 1110 can count as a separate client. In some cases, each column of the processing engine array 1110 can output a result, such that each column can count as a separate write client. In some cases, output from the processing engine array 1110 can be written into the memory banks 1114 that can then subsequently provide input data for the processing engine array 1110. As another example, the activation engine 1116 and the pooling engine 1118 can include multiple execution channels, each of which can be separate memory clients. The memory banks 1114 can be implemented, for example, using static random access memory (SRAM).

In various implementations, the memory subsystem 1104 can include control logic. The control logic can, for example, keep track of the address spaces of each of the memory banks 1114, identify memory banks 1114 to read from or write to, and/or move data between the memory banks 1114. In some implementations, memory banks 1114 can be hardwired to particular clients. For example, a set of memory banks 1114 can be hardwired to provide values to the rows of the processing engine array 1110, with one memory bank servicing each row. As another example, a set of memory banks can be hard wired to receive values from columns of the processing engine array 1110, with one memory bank receiving data for each column.

The processing engine array 1110 is the computation matrix of the example accelerator 1102. The processing engine array 1110 can, for example, execute parallel integration, convolution, correlation, and/or matrix multiplication, among other things. The processing engine array 1110 includes multiple processing engines 1111, arranged in rows and columns, such that results output by one processing engine 1111 can be input directly into another processing engine 1111. Processing engines 1111 that are not on the outside edges of the processing engine array 1110 thus can receive data to operate on from other processing engines 1111, rather than from the memory subsystem 1104.

In various examples, the processing engine array 1110 uses systolic execution, in which data arrives at each processing engine 1111 from different directions at regular intervals. In some examples, input data can flow into the processing engine array 1110 from the left and weight values can be loaded at the top. In some examples weights and input data can flow from the left and partial sums can flow from top to bottom. In these and other examples, a multiply-and-accumulate operation moves through the processing engine array 1110 as a diagonal wave front, with data moving to the right and down across the array. Control signals can be input at the left at the same time as weights, and can flow across and down along with the computation.

In various implementations, the number of columns in the processing engine array 1110 determines the computational capacity of the processing engine array 1110, and the number of rows determines the required memory bandwidth for achieving maximum utilization of the processing engine array 1110. The processing engine array 1110 can have, for example, 64 columns and 428 rows, or some other number of columns and rows.

An example of a processing engine 1111 is illustrated in FIG. 11 in an inset diagram. As illustrated by this example, a processing engine 1111 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1111.

In the illustrated example, an input from above can include a partial sum, p_in, provided either from another processing engine 1111 or from a previous round of computation by the processing engine array 1110. When starting a computation for a new set of input data, the top row of the processing engine array 1110 can receive a fixed value for p_in, such as zero. As illustrated by this example, i and w are multiplied together and the result is summed with p_in to produce a new partial sum, p_out, which can be input into another processing engine 1111. Various other implementations of the processing engine 1111 are possible.

Outputs from the last row in the processing engine array 1110 can be temporarily stored in the results buffer 1112. The results can be intermediate results, which can be written to the memory banks 1114 to be provided to the processing engine array 1110 for additional computation. Alternatively, the results can be final results, which, once written to the memory banks 1114 can be read from the memory subsystem 1104 over the communication fabric 1120, to be output by the system.

In some implementations, the accelerator 1102 includes an activation engine 1116. In these implementations, the activation engine 1116 can combine the results from the processing engine array 1110 into one or more output activations. For example, for a convolutional neural network, convolutions from multiple channels can be summed to produce an output activation for a single channel. In other examples, accumulating results from one or more columns in the processing engine array 1110 may be needed to produce an output activation for a single node in the neural network. In some examples, activation engine 1116 can be bypassed.

In various examples, the activation engine 1116 can include multiple separate execution channels. In these examples, the execution channels can correspond to the columns of the processing engine array 1110, and can perform an operation on the outputs of a column, the result of which can be stored in the memory subsystem 1104. In these examples, the activation engine 1116 may be able to perform between 1 and n parallel computations, where n is equal to the number of columns in the processing engine array 1110. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1102 can include a pooling engine 1118. Pooling is the combining of outputs of the columns of the processing engine array 1110. Combining can include for example, computing a maximum value, a minimum value, an average value, a median value, a summation, a multiplication, or another logical or mathematical combination. In various examples, the pooling engine 1118 can include multiple execution channels that can operating on values from corresponding columns of the processing engine array 1110. In these examples, the pooling engine 1118 may be able to perform between 1 and n parallel computations, where n is equal to the number of columns in the processing engine array 1110. In various examples, execution channels of the pooling engine 1118 can operate in parallel and/or simultaneously. In some examples, the pooling engine 1118 can be bypassed.

Herein, the activation engine 1116 and the pooling engine 1118 may be referred to collectively as execution engines. The processing engine array 1110 is another example of an execution engine. Another example of an execution engine is a Direct Memory Access (DMA) engine, which may be located outside the accelerator 1102.

Input data 1150 can arrive over the communication fabric 1120. The communication fabric 1120 can connect the accelerator 1102 to other components of a processor, such as a DMA engine that can obtain input data 1150 from an Input/Output (I/O) device, a storage drive, or a network interface. The input data 1150 can be, for example one-dimensional data, such as a character string or numerical sequence, or two-dimensional data, such as an array of pixel values for an image or frequency and amplitude values over time for an audio signal. In some examples, the input data 1150 can be three-dimensional, as may be the case with, for example, the situational information used by a self-driving car or virtual reality data. In some implementations, the memory subsystem 1104 can include a separate buffer for the input data 1150. In some implementations, the input data 1150 can be stored in the memory banks 1114 when the accelerator 1102 receives the input data 1150.

In some examples, the accelerator 1102 can implement a neural network processing engine. In these examples, the accelerator 1102, for a set of input data 1150, can execute a neural network to perform a task for which the neural network was trained. Executing a neural network on a set of input data can be referred to as inference or performing inference.

The weights for the neural network can be stored in the memory subsystem 1104, along with input data 1150 on which the neural network will operate. The neural network can also include instructions, which can program the processing engine array 1110 to perform various computations on the weights and the input data. The instructions can also be stored in the memory subsystem 1104, in the memory banks 1114 or in a separate instruction buffer. The processing engine array 1110 can output intermediate results, which represent the outputs of individual layers of the neural network. In some cases, the activation engine 1116 and/or pooling engine 1118 may be enabled for computations called for by certain layers of the neural network. The accelerator 1102 can store the intermediate results in the memory subsystem 1104 for inputting into the processing engine array 1110 to compute results for the next layer of the neural network. The processing engine array 1110 can further output final results from a last layer of the neural network. The final results can be stored in the memory subsystem 1104 and then be copied out to host processor memory or to another location.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules. Any of the methods described herein can be implemented as a computer-readable medium or computer program product comprising instructions which, when the program is executed by one or more computers, cause the one or more computers to carry out the steps of the method. Such computer program products can be transmitted, over a wired or wireless network, in a data carrier signal carrying the computer program product.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of accelerating an execution of a neural network, the method comprising:
receiving, by a compiler, a description of the neural network; and
performing, by the compiler, operations during compilation comprising:
identifying a plurality of operators based on the description of the neural network, wherein the plurality of operators includes a first operator and a second operator;
generating a plurality of symbolic models associated with the plurality of operators, wherein the plurality of symbolic models includes a first symbolic model associated with the first operator and a second symbolic model associated with the second operator, and wherein generating the plurality of symbolic models includes, for each symbolic model of the plurality of symbolic models:
identifying a nested loop associated with an operator of the plurality of operators, wherein the nested loop includes multiple iterative loops;
defining a loop order for the symbolic model based on the nested loop; and
defining a set of data dependencies for the symbolic model based on the nested loop;
extracting a set of inter-operator dependencies based on the description of the neural network, wherein the set of inter-operator dependencies includes an indication that the first operator is performed prior to the second operator;
analyzing the plurality of symbolic models and the set of inter-operator dependencies to identify combinable pairs of nested loops;
determining that a first nested loop associated with the first operator is combinable with a second nested loop associated with the second operator based on the first symbolic model, the second symbolic model, and the set of inter-operator dependencies, wherein the first symbolic model includes a first loop order and a first set of data dependencies, and wherein the second symbolic model includes a second loop order and a second set of data dependencies;
combining the first nested loop with the second nested loop to form a combined nested loop; and
generating machine instructions for the neural network based on the combined nested loop.

2. The method of claim 1, further comprising:
generating a third symbolic model for the combined nested loop, wherein the third symbolic model includes a third loop order based on the first loop order and the second loop order, and wherein the third symbolic model includes a third set of data dependencies based on the first set of data dependencies and the second set of data dependencies.

3. The method of claim 2, wherein the third loop order is identical to one or both of the first loop order and the second loop order.

4. The method of claim 1, wherein determining that the first operator is combinable with the second operator includes:
determining that the first loop order is combinable with the second loop order.

5. A method comprising:
performing, by a compiler, operations during compilation comprising:
identifying a plurality of operators based on a description of a neural network;
generating a plurality of symbolic models associated with the plurality of operators, wherein generating the plurality of symbolic models includes, for each symbolic model of the plurality of symbolic models:
identifying a nested loop associated with an operator of the plurality of operators; and
determining a set of data dependencies for the symbolic model based on the nested loop;
analyzing the plurality of symbolic models to identify a combinable pair of nested loops;
combining the combinable pair of nested loops to form a combined nested loop; and
generating machine instructions for the neural network based on the combined nested loop.

6. The method of claim 5, further comprising, for each symbolic model of the plurality of symbolic models:
determining a loop order for the symbolic model based on the nested loop.

7. The method of claim 5, further comprising:
mapping the combined nested loop to the machine instructions.

8. The method of claim 5, further comprising:
extracting a set of inter-operator dependencies based on the description of the neural network, wherein the combinable pair of nested loops are identified based on the set of inter-operator dependencies.

9. The method of claim 8, further comprising:
determining that a first nested loop associated with a first operator is combinable with a second nested loop associated with a second operator based on a first symbolic model associated with the first operator, a second symbolic model associated with the second operator, and the set of inter-operator dependencies, wherein the set of inter-operator dependencies includes an indication that the first operator is performed prior to the second operator.

10. The method of claim 9, further comprising:
combining the first nested loop with the second nested loop to form the combined nested loop; and
generating a third symbolic model for the combined nested loop, wherein the third symbolic model includes a third loop order based on a first loop order of the first symbolic model and a second loop order of the second symbolic model, and wherein the third symbolic model includes a third set of data dependencies based on a first set of data dependencies of the first symbolic model and a second set of data dependencies of the second symbolic model.

11. The method of claim 10, wherein the third loop order is identical to one or both of the first loop order and the second loop order.

12. The method of claim 10, further comprising:
adding the third symbolic model to the plurality of symbolic models; and
analyzing the plurality of symbolic models to identify a second combinable pair of nested loops.

13. A non-transitory computer-readable medium having stored therein instructions that, when executed by one or more processors, cause the one or more processors to execute a compiler, the compiler performing operations during compilation including:

identifying a plurality of operators based on a description of a neural network;
generating a plurality of symbolic models associated with the plurality of operators, wherein generating the plurality of symbolic models includes, for each symbolic model of the plurality of symbolic models:
  identifying a nested loop associated with an operator of the plurality of operators; and
  determining a set of data dependencies for the symbolic model based on the nested loop;
analyzing the plurality of symbolic models to identify a combinable pair of nested loops;
combining the combinable pair of nested loops to form a combined nested loop; and
generating machine instructions for the neural network based on the combined nested loop.

14. The non-transitory computer-readable medium of claim 13, wherein the operations further comprise, for each symbolic model of the plurality of symbolic models:
  determining a loop order for the symbolic model based on the nested loop.

15. The non-transitory computer-readable medium of claim 13, wherein the operations further comprise:
  mapping the combined nested loop to the machine instructions.

16. The non-transitory computer-readable medium of claim 13, wherein the operations further comprise:
  extracting a set of inter-operator dependencies based on the description of the neural network, wherein the combinable pair of nested loops are identified based on the set of inter-operator dependencies.

17. The non-transitory computer-readable medium of claim 16, wherein the operations further comprise:
  determining that a first nested loop associated with a first operator is combinable with a second nested loop associated with a second operator based on a first symbolic model associated with the first operator, a second symbolic model associated with the second operator, and the set of inter-operator dependencies, wherein the set of inter-operator dependencies includes an indication that the first operator is performed prior to the second operator.

18. The non-transitory computer-readable medium of claim 17, wherein the operations further comprise:
  combining the first nested loop with the second nested loop to form the combined nested loop; and
  generating a third symbolic model for the combined nested loop, wherein the third symbolic model includes a third loop order based on a first loop order of the first symbolic model and a second loop order of the second symbolic model, and wherein the third symbolic model includes a third set of data dependencies based on a first set of data dependencies of the first symbolic model and a second set of data dependencies of the second symbolic model.

19. The non-transitory computer-readable medium of claim 18, wherein the third loop order is identical to one or both of the first loop order and the second loop order.

20. The non-transitory computer-readable medium of claim 18, wherein the operations further comprise:
  adding the third symbolic model to the plurality of symbolic models; and
  analyzing the plurality of symbolic models to identify a second combinable pair of nested loops.

* * * * *